under 35 U.S.C. 154(b) by 794 days.

(12) United States Patent  (10) Patent No.: US 7,432,613 B2
Jabaji et al.  (45) Date of Patent: Oct. 7, 2008

(54) SELF-PROTECTIVE HIGH-CURRENT LOW-LOSS BI-DIRECTIONAL SEMICONDUCTOR SWITCH MODULE AND METHOD OF OPERATION

(75) Inventors: Issam Jabaji, Morton Grove, IL (US); Shadi Jabaji, Morton Grove, IL (US)

(73) Assignee: C.E. Niehoff & Co., Evanston, IL (US)

( * ) Notice: Subject to any disclaimer, the term of this patent is extended or adjusted under 35 U.S.C. 154(b) by 794 days.

(21) Appl. No.: 11/040,339

(22) Filed: Jan. 21, 2005

(65) Prior Publication Data

US 2006/0167568 A1  Jul. 27, 2006

(51) Int. Cl.
*B60R 22/00* (2006.01)
(52) U.S. Cl. .................................. 307/10.6; 307/126
(58) Field of Classification Search ............... 307/10.6, 307/126
See application file for complete search history.

(56) References Cited

U.S. PATENT DOCUMENTS

| 4,454,454 A | 6/1984 | Valentine |
| 4,574,209 A | 3/1986 | Lade et al. |
| 4,654,568 A | 3/1987 | Mansman |
| 4,705,997 A | 11/1987 | Juzswik |
| 4,721,986 A | 1/1988 | Kinzer |
| 4,755,697 A | 7/1988 | Kinzer |
| 5,210,475 A | 5/1993 | Juzswik et al. |
| 5,323,044 A | 6/1994 | Rumennik et al. |
| 5,399,921 A | 3/1995 | Dobbelaere |
| 5,430,401 A | 7/1995 | Shtulman |
| 5,493,134 A | 2/1996 | Mehrotra et al. |
| 5,495,155 A | 2/1996 | Juzswik et al. |
| 5,600,160 A | 2/1997 | Hvistendahl |
| 5,680,063 A | 10/1997 | Ludwig et al. |
| 6,181,190 B1 | 1/2001 | Wiklund et al. |
| 6,420,905 B1 | 7/2002 | Davis et al. |

*Primary Examiner*—Robert L. Deberadinis
(74) *Attorney, Agent, or Firm*—Law Offices of Michael M. Ahmadshahi

(57) ABSTRACT

A high current, light weight, thermally stable, bidirectional semiconductor switch module in an electrical system uses MOSFET technology in a back-to-back parallel architecture. The device comprises a controller which permits it to operate in high electrical noise environments. The device is further controlled to operate in either or both directions based on external events such as voltage changes associated with the electrical system and with vehicle operating conditions. The device operates at currents typically from a few amperes to 1000 amperes and may be used as a circuit breaker, over voltage switch, isolation switch, transient protection switch, and voltage converter. The device functions to replace the solenoids and relays associated with starter motors in a vehicle electrical system.

42 Claims, 5 Drawing Sheets

Switch Block Diagram

Schematic Diagram

FIG. 1

Functional Diagram

SELF-PROTECTIVE HIGH-CURRENT LOW-LOSS BI-DIRECTIONAL SEMICONDUCTOR SWITCH MODULE AND METHOD OF OPERATION

This specification includes a compact disk appendix, which contains computer program code listings pursuant to 37 C.F.R. 1.52(e), and is hereby incorporated by reference. The computer codes are in ASCII format and are as follows:

| Creation Date | Creation Time | File Size (Kilobytes) | File Name |
| --- | --- | --- | --- |
| 01/21/2005 | 9:49 AM | 18 | SWITCH.C |
| 01/21/2005 | 9:49 AM | 2 | VECTORS.H |
| 01/21/2005 | 9:49 AM | 4 | REGISTERS.H |
| 01/21/2005 | 9:49 AM | 4 | PID_D.S19 |
| 01/21/2005 | 9:48 AM | 30 | PID.MAP |
| 01/21/2005 | 9:47 AM | 2 | DEFINES.H |

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to high power bi-directional solid-state switches used in vehicle electrical systems. In particular, this invention relates to a self-protective high-current low-loss bi-directional semiconductor switch device and method of operation, wherein the switch device comprises an intelligent controller for controllable switching in response to various operating conditions.

BACKGROUND

The present invention relates to a self-protective high-current low-loss bi-directional semiconductor switch device and method of operation. More specifically, the present invention focuses on a bi-directional semiconductor switch module capable of controlling the magnitude and direction of an energy flow, for instance electrical current, between a first and a second terminal of the bi-directional switch module in response to a measured value of the energy flow and a default value, and wherein the default value could be replaced by an input value received via a receiver included in the bi-directional switch module. The device is constructed such that high-current, typically from 100 to 1000 amperes can be accommodated, making it ideal for applications in vehicle electrical systems.

Electrical systems comprising bi-functional devices where each device can operate either as a load or a source require a bi-directional switch so that electrical energy can be exchanged between the devices according to the system operating conditions. For instance, a vehicle electrical system generally comprises a battery and an alternator where each device can operate either as a load or a source. Whenever the alternator is not operating, including the engine start process, the battery provides electrical energy to the vehicle electrical system. When the battery is the source of electrical energy it is desirable to have a switch monitor and limit the battery discharge energy, and to disconnect the battery from the electrical system if needed. The alternator functions as a source of electrical energy after it attains a certain RPM, at which point the battery is recharged by the alternator. When the alternator is the source of electrical energy, it is desirable to have a switch monitor and limit the alternator power to the battery and the electrical system, and to disconnect the battery from the electrical system if the battery recharge current demand causes the alternator capacity to be exceeded. It is also desirable that the switch can detect a short circuit current in either direction and disconnect the energy source from the short circuit. Therefore, a bi-directional switch module is needed that can control the magnitude and direction of electrical current by controllably switch on/off said electrical current in either direction between two such bi-functional devices.

Vehicle electrical systems comprising multiple systems of batteries require controlled electrical energy exchange between the batteries. For instance, a vehicle electrical system utilizing a main and an auxiliary system of batteries requires controllable switching of electrical current between the battery systems according to the vehicle operating conditions. The main system is used during startup and whenever the alternator is not operating, and the auxiliary system is used when the vehicle engine is not operating. The main and auxiliary systems are connected in a parallel configuration and require a switchable means between them to control the exchange of electrical energy in both directions according to the vehicle operating conditions.

In the event that the main system is depleted or otherwise defective, the auxiliary system can transfer electrical energy to the main system. Similarly, if the auxiliary system has exhausted its energy and there still remains a critical need to provide electrical energy to the electrical loads, the main system can transfer electrical energy to the auxiliary system. However, a transfer of electrical energy between these systems based solely on the amount of energy stored within these systems is undesirable. In a situation where the main system's electrical energy is needed for vehicle startup, it is detrimental to allow the system to supply electrical energy to a depleted auxiliary system. Similarly, when there is a critical need for the auxiliary system to provide electrical energy to an auxiliary load, it is undesirable to allow the auxiliary system to supply electrical energy to a depleted main system. A bi-directional switch module that can receive input values for controlling the magnitude and direction of electrical energy exchange according to the vehicle operating condition is preferred.

Although various devices have been proposed that address some aspects of the present invention, no single device has been constructed which provides controlled switching of high electrical currents in either direction between two bi-functional devices. For example, Rumennik, U.S. Pat. No. 5,323,044 discloses a novel way of constructing bi-directional switches utilizing MOSFETS, but does not address controlling the magnitude and direction of electrical current between such MOSFETS. In Kinzer, U.S. Pat. No. 4,755,697, the invention focuses on a high voltage bi-directional output semiconductor field effect transistor that operates at high voltages and replaces electromechanical reed relays. The present invention controls high electrical currents in the 100-1000 amperes. The Juzswik patent, U.S. Pat. No. 5,210,475 discloses a current sensing circuit utilizing MOSFETS for detecting over-current condition in "H-bridge-type" power delivery circuits for bi-directional motors, but it does not address controlled switching of high electrical currents. Consequently, there is a need for a bi-directional switch module that can control the magnitude and direction of large electrical currents between a first and second terminal of such switch module.

Modern vehicle electrical systems utilize bi-functional devices that demand large electrical currents. Furthermore, electrical energy exchange between these devices must be controlled, not simply based on the available energy, but also the operating condition of the vehicle. Various vehicle operating conditions affect the function of each device that make up the vehicle electrical system. For instance, in a vehicle electrical system comprising a battery and an alternator, the battery operates as an electrical energy source during the vehicle start process and subsequently becomes an electrical load when the vehicle is operating. The alternator is an electrical energy load during the start process and operates as an electrical energy source while the vehicle engine is operating. Such devices require a bi-directional switch module that can control the magnitude and direction of large electrical energy between said devices while protecting the electrical system.

SUMMARY

The present invention discloses a bi-directional switch device and method of operation for controlling the magnitude and direction of an energy flow between a first and a second terminal of the bi-directional switch by controllably switching on/off said energy flow in either direction. Additionally, the bi-directional switch is capable of protecting itself by switching off the energy flow in either direction when the energy flow, its rate of change, duration, or when a temperature of the bi-directional switch exceed threshold values.

In one aspect a bi-directional switch module is disclosed comprising a sensor, a bi-directional switch, and a controller. Preferably, the device comprises a bi-directional semiconductor switch, wherein an energy flow between a first and a second terminal of the bi-directional switch can be controllably switched on/off by applying a control signal to a control terminal of the bi-directional switch. Preferably, the device comprises a sensor capable of sensing the magnitude and direction of the energy flow between the first and the second terminal of the bi-directional switch. Preferably, the device comprises a controller, such as a microprocessor, that controls the magnitude and direction of the energy flow by applying a time-varying control signal so that the average value of the energy flow in a given direction, as detected by the sensor, does not exceed the default average value recognized by the controller. Preferably, the processor is programmed to switch off the energy flow in either direction by applying a control signal to the control terminal when either the energy rate of change or the energy magnitude after a predetermined event recognized by the controller is greater than the default energy rate of change or energy magnitude, respectively. Preferably, the sensor is further capable of measuring a temperature of the bi-directional switch module and the processor is further programmed to apply a control signal when the temperature is greater than one or more overheat temperatures. Preferably, the device is further capable of receiving input values via a receiver and the switching operation is performed according to either the input values or default values.

In one aspect, a method is disclosed comprising sensing an average magnitude of an energy flow in either direction between a first and a second terminal of a bidirectional switch module, comparing the average magnitude to a default magnitude, controllably limiting the energy flow in response to the measured and default values. Preferably, the method further comprises sensing an energy rate of change in either direction, comparing the rate of change to one or more surge magnitudes, and switching off the energy flow in either direction by applying a surge off signal when the energy rate of change exceeds at least one of the one or more surge magnitudes. Preferably, the method further comprises switching on the energy flow in either direction by applying a surge on signal when a reset signal is received. Preferably, the method further comprises sensing a energy magnitude in either direction after an event recognized by the controller, comparing the energy magnitude to one or more energy change magnitudes, and switching off the energy flow in either direction by applying a energy change off signal when the energy magnitude is greater than at least one of the one or more energy change magnitudes. Preferably, the method further comprises sensing a temperature of the bidirectional switch module, comparing the temperature to one or more overheat temperatures, and switching off the energy flow in either direction by applying an overheat signal when the temperature is greater than at least one of the one or more overheat temperatures. Preferably, the method further comprises receiving input values via a receiver and controllably limiting the energy flow in response to the input values or default values.

Other features and advantages of the invention will become apparent to those of ordinary skill in the art upon review of the following drawings, detailed description and claims.

DETAILED DESCRIPTION OF THE PRESENTLY PREFERRED EMBODIMENTS

Figure 1:
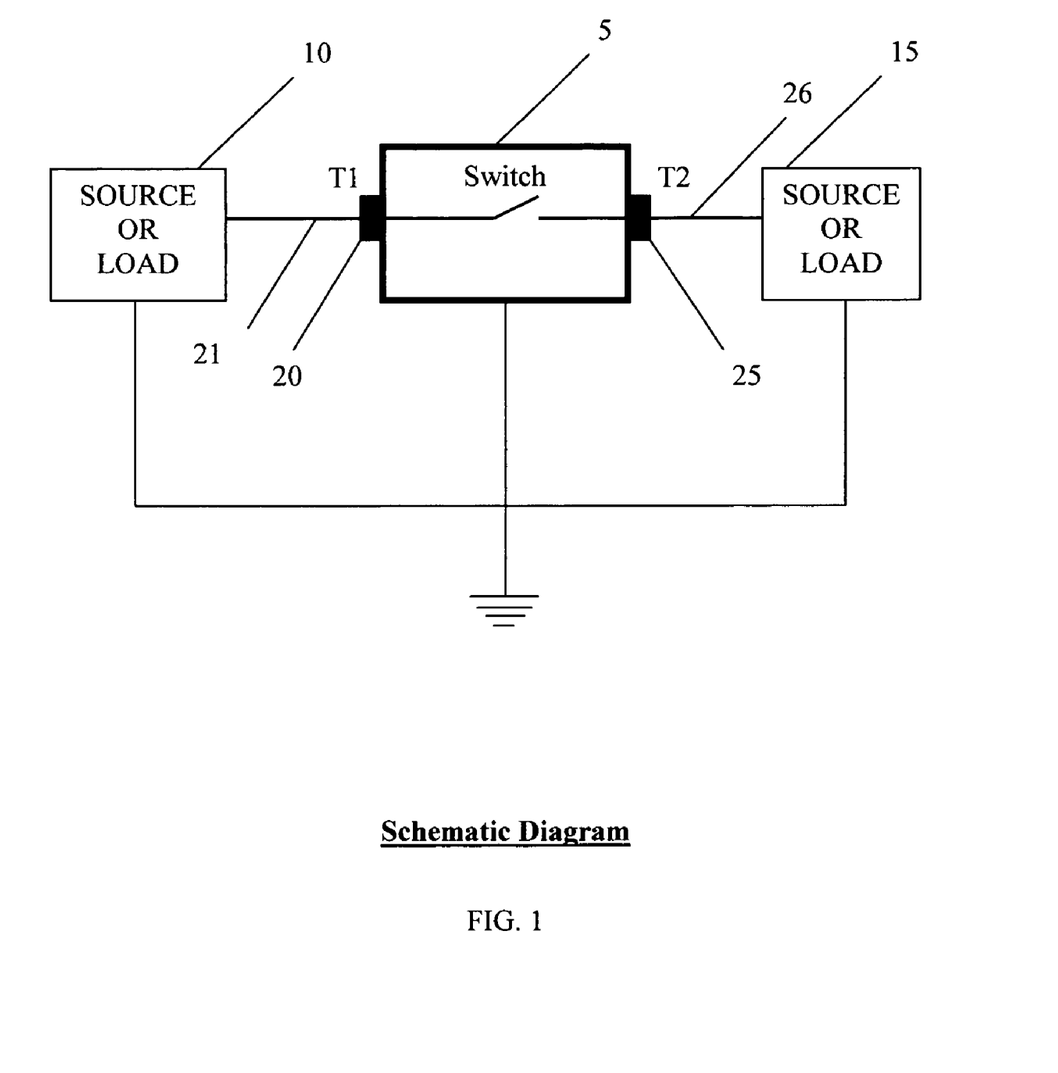
FIG. 1 shows a schematic diagram of a bi-directional switch module according to a preferred embodiment.

FIG. 1 depicts a schematic diagram of one embodiment of a bi-directional switch module 5. In this embodiment the bi-directional switch module 5 is connected via terminals T1 20 and T2 25 to two bi-functional devices 10 and 15, each of which can act as a source or as a load. The bi-directional switch module 5 controls electrical current in either direction between the terminal T1 20 and the terminal T2 25. A sensor and a control device, such as a microprocessor, are included in the bi-directional switch module 5. The bi-directional switch module 5 can be switched off if the current, flowing in either direction between T1 20 and T2 25, its rate of change, duration, or a temperature of the bi-directional switch module 5 exceed threshold values stored in the microprocessor memory. During steady state operation the microprocessor may apply a time-varying control signal to the bi-directional switch module 5 so that the average current does not exceed at least one of the one or more default average current values stored in the microprocessor memory. The default values can be different for each direction.

Figure 2:
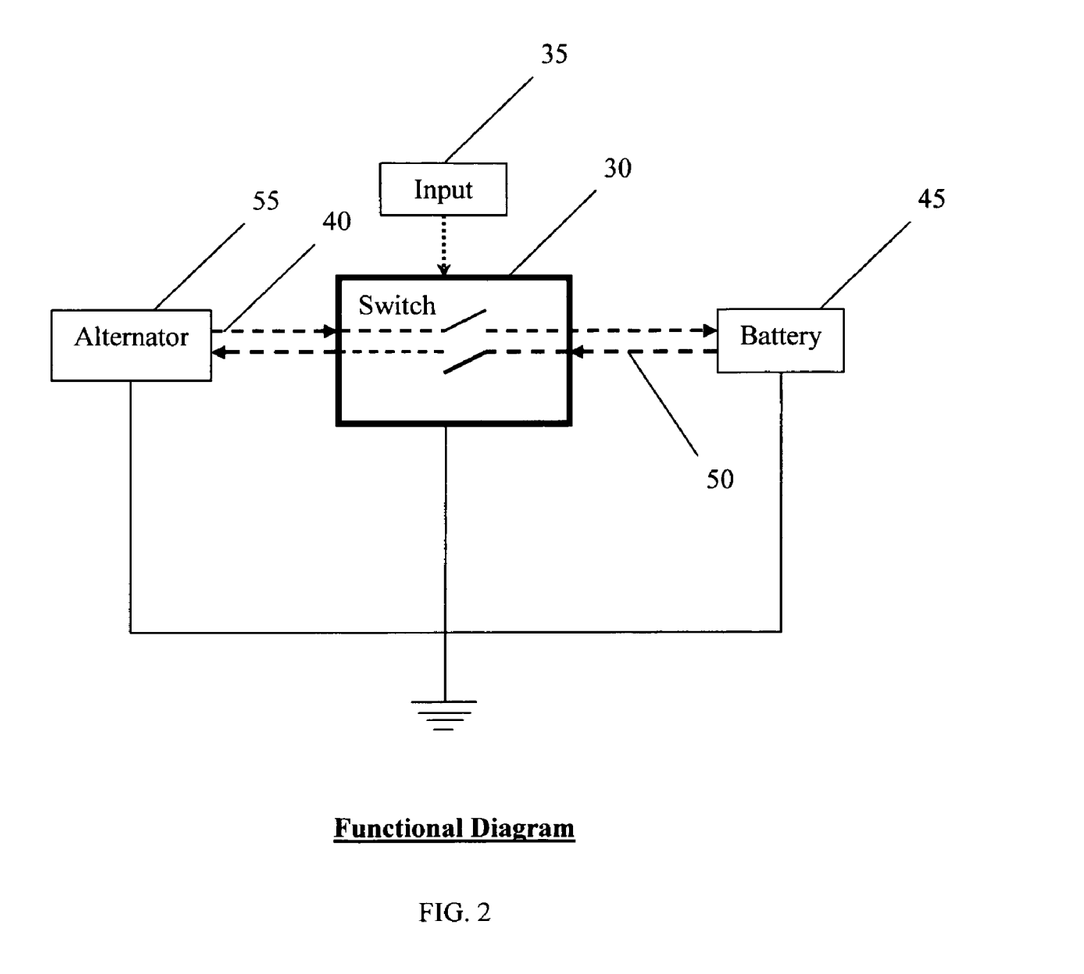
FIG. 2 is a functional diagram of a bi-directional switch module according to a preferred embodiment.

FIG. 2 depicts a functional diagram of one embodiment of a bi-directional switch module 30. In this embodiment the bi-directional switch module 30 comprises an input terminal 35 wherein a control device such as a microprocessor can receive one or more input average magnitudes of an energy flow, for instance electrical current, in either direction and apply a time-varying control signal according to the received input average magnitudes. The input terminal 35 can also be used to receive threshold values for the current flowing in either direction, its rate of change, duration, or a temperature of the bi-directional switch module 30. According to one alternative application of the present embodiment, the bi-directional switch module 30 can be utilized in a vehicle electrical system comprising a battery 45 and an alternator 55 where the battery 45 and the alternator 55 can act either as a source or as a load, depending on the vehicle operating condition. For instance, in a typical vehicle operation, during start up, the battery 45 acts as a source of electrical energy to the alternator 55 and current flows at 50 from the battery 45 to the alternator 55. When the alternator 55 reaches a certain RPM, it acts as an electrical energy source and current flows from it, at 40, to the battery 45. Input average magnitudes or threshold values can vary during these operating conditions. Accordingly, the bi-directional switch module 30 can control electrical current in either direction between the battery 45 and the alternator 55 according to the input signal received via the input terminal 35.

Figure 3:
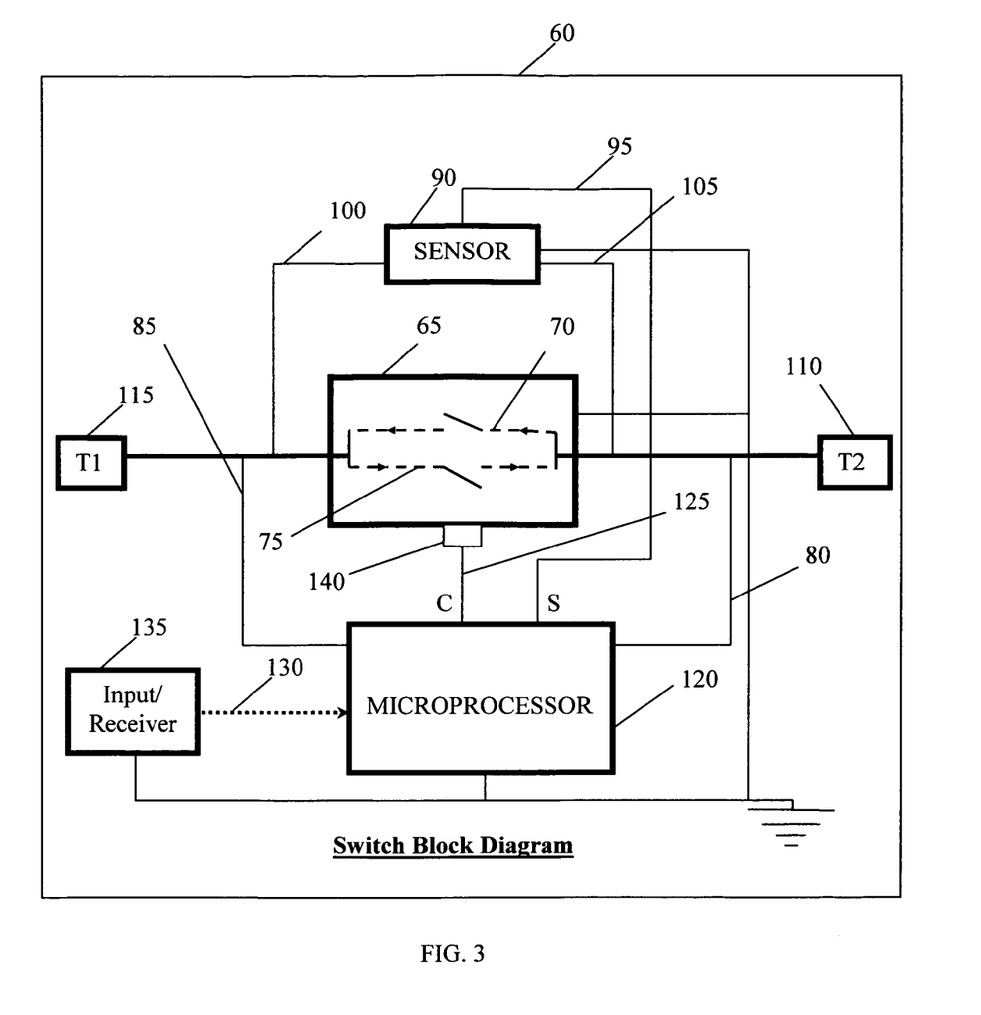
FIG. 3 is a block diagram of a bi-directional switch module that depicts presently preferred embodiments.

FIG. 3 is a block diagram that depicts alternative embodiments of a bi-directional switch module 60. In one embodiment, the bi-directional switch module 60 comprises a bi-directional switch 65 which includes a first terminal T1 115 and a second terminal T2 110 wherein an energy flow in either direction, at 70 or 75, between said terminals can be controlled by applying a control signal 125 to a control terminal 140 of the bi-directional switch 65, a sensor 90 operative to measure an average magnitude of the energy flow in either direction, at 70 or 75, between said terminals and making it available via a signal on a sense line 95, and a processor 120, wherein the processor 120 operates to controllably switch on/off the energy flow in either direction, at 70 or 75, by applying a time-varying control signal 125 to the control terminal 140 so that the average magnitude of the energy flow, received via the sense line 95, does not exceed one or more default average magnitudes stored in the processor 120.

For instance, the bi-directional switch module 60 is initially configured so that the bi-directional switch 65 conducts electrical current in both directions, at 70 and 75, between T1 115 and T2 110. The sensor 90 measures an average value of the electrical current in a particular direction, say from T1 115 to T2 110 at 75, and generates a signal on the sense line 95 containing the average value and the corresponding direction of the electrical current. The processor 120 receives the average value and the direction via the sense line 95 and compares the average value to a default average value, stored in the memory of the processor 120, associated with that direction. If the average value is below the default average value for that particular direction, the processor 120 takes no action with respect to applying a time-varying control signal 125. When the average value exceeds the default average value, the processor 120 applies a time-varying control signal 125 to control the average magnitude of current in that direction.

Figure 4:
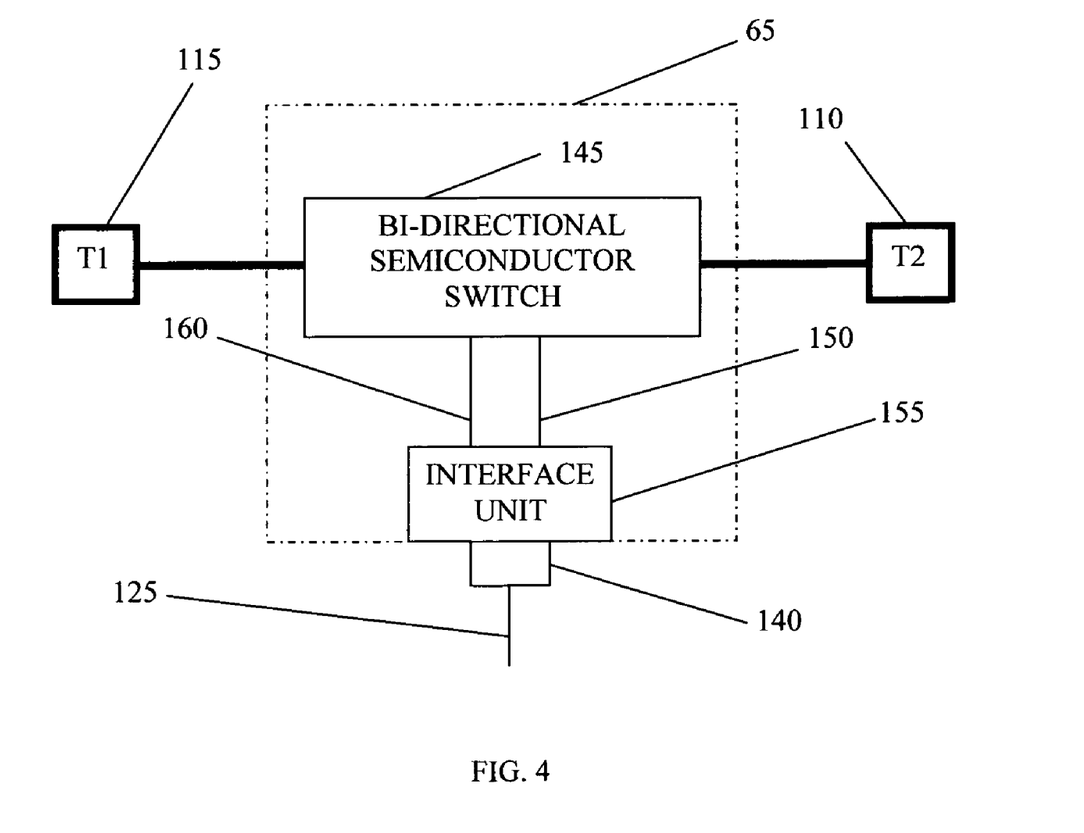
FIG. 4 is a block diagram of a bi-directional switch with active input interface according to a preferred embodiment.

In one embodiment, the bi-directional switch 65 includes a bi-directional semiconductor switch 145 and an interface unit 155 as shown in FIG. 4. The bi-directional semiconductor switch 145 may comprise a pair of MOSFETS. According to this alternative embodiment, the source terminal of a first MOSFET is connected to the drain terminal of a second MOSFET, and the drain terminal of the first MOSFET is connected to the source terminal of the second MOSFET, thus providing a first and a second terminals of the bi-directional switch 65, such as T1 115 and T2 110 discussed above. A first and a second output terminal, 150 and 160, of the interface unit 155 are connected to the gate terminals of the first and second MOSFETS and applying a time-varying control signal 125 to a control terminal 140 of the interface unit 155, causes the interface unit to selectively apply the time-varying control signal to the gate terminal of one of the MOSFETS.

In applications where switching of high current levels are required, one variation of the present embodiment includes a bi-directional semiconductor switch that comprises two arrays of MOSFETS, each array connected in a parallel configuration. According to this alternative embodiment, the source terminals of all the MOSFETS in a first parallel array are connected to the drain terminals of all the MOSFETS in a second parallel array, and the drain terminals of all the MOSFETS in the first parallel array are connected to the source terminals of all the MOSFETS in the second parallel array, thus providing a first and a second terminals of the bi-directional switch 65, such as T1 115 and T2 110 discussed above. The gate terminals of all the MOSFETS in the first parallel array are connected to one of the outputs of an interface unit 155, such as that shown in FIG. 4 at 150, while the gate terminals of all the MOSFETS in the second parallel array are connected to the other output of the interface unit 155 at 160. Applying a time-varying control signal 125 to the control terminal 140 of the interface unit 155 causes said interface unit to selectively apply the time-varying control signal 125 to the gate terminals of all the MOSFETS in one of the parallel arrays.

In one embodiment, the bi-directional switch module 60, comprising a bi-directional semiconductor switch 65, is configured such that when a voltage level of a time-varying electrical signal 125, applied to a control terminal 140 of an interface unit 155 included in the bi-directional switch 65, is substantially above a mean voltage level, the interface unit 155 applies the time-varying electrical signal 125 to the gate terminal of one of the MOSFETS, thus allowing the energy to flow from the first terminal T1 115 to the second terminal T2 110 at 75. When the voltage level of the time-varying electrical signal 125 is substantially below a mean voltage level, the interface unit 155 applies the time-varying electrical signal 125 to the gate terminal of the other MOSFET, thus allowing the energy to flow from the second terminal T2 110 to the first terminal T1 115 at 70.

The sensor 90 measures an average value of an energy flow, for instance electrical current, in either direction, at 70 or 75, between T1 115 and T2 110 by measuring instantaneous values and calculating an average value from the instantaneous values. The instantaneous values are captured according to the resolution of the sensor used. In one embodiment, the sensor 90 comprises a sensor with resolution in the order of one millisecond where instantaneous current values are represented by one millisecond sampled values. According to one variation of the present embodiment, an average value of current can be obtained by adding several of these samples, for instance one thousand samples, and dividing them by the number of samples to arrive at an average value. According to a variation of the present embodiment, the sensor 90 comprises a sensor that measures instantaneous values of electrical current and transmits them along with their directions to the processor 120 via the sense line 95. The processor 120 is programmed to receive the instantaneous values and compute an average value from the instantaneous values.

In one embodiment, the sensor 90 comprises a sensor that is capable of measuring a first voltage at 100 and a second voltage at 105 and transmitting them to the processor 120 via the sense line 95. The processor 120 is programmed to compute an average magnitude of electrical current in either direction, at 70 or 75, between T1 115 and T2 110 and apply a time-varying control signal accordingly as discussed hereinabove. For instance, the sensor measures a first voltage at 100, say 28 Volts, and a second voltage at 105, say 20 Volts. This can occur when the bi-directional switch 65 is set to open-circuit position in both directions at 70 and 75. The processor is programmed to compute a direction of electrical current by subtracting the first voltage 100 from the second voltage 105. According to this example, the direction of current is from T1 115 to T2 110 because the result of the subtraction, +8 Volts, is a positive value. When the bi-directional switch 65 is set to closed-circuit position the first and second voltage at 100 and 105 will be substantially equal to a third voltage. The processor 120 is programmed to compute a voltage difference by subtracting the third voltage from a larger value of the first and second voltage, in this example the first voltage at 100, and comparing the voltage difference to a default voltage associated with that direction and apply a time-varying control signal so that the voltage difference does not exceed the default voltage.

The sensor 90 generates a signal on the sense line 95 which contains a measured average value. The signal is utilized by the processor 120 to control the switching operation. In one embodiment, the signal comprises a data frame which includes an average magnitude of electrical current in a corresponding direction. For instance, a sensor can be utilized that generates an eight-bit data frame where the most significant bit contains the direction of current and the remaining seven bits contain the average magnitude.

In one embodiment, the sensor 90 is further capable of measuring a difference magnitude of an energy flow, for instance electrical current, in either direction, at 70 or 75, between T1 115 and T2 110. The difference magnitude is the difference between two consecutive instantaneous values obtained a pre-determined time interval apart. The sensor 90 generates a signal on the sense line 95 containing the difference magnitude in a corresponding direction. The processor 120 utilizes the signal to control the switching of a bi-directional switch 65 by applying a time-varying signal 125 to the control terminal 140 of the bi-directional switch 65. For instance, the sensor 90 is configured to detect instantaneous values of electrical current at a particular sampling rate, say one millisecond, and compute the difference between the instantaneous values obtained 30 milliseconds apart. According to a variation of the present embodiment, the sensor 90 comprises a sensor that detects instantaneous values of electrical current and transmits them along with their directions to the processor 120 via a signal on the sense line 95, wherein the processor 120 is programmed to receive the signal and compute the difference from the instantaneous values.

In one embodiment, the sensor 90 is further capable of sensing a temperature of the bidirectional switch module 60 and generating a signal containing the measured temperature on the sense line 95. The signal is received by the processor 120, wherein the processor switches off the energy flow in either direction, at 70 or 75, between T1 115 and T2 110 when the temperature is greater than one or more pre-determined temperatures stored in the memory of the processor 120. According to one variation of the present embodiment, the sensor 90 senses a temperature of one of the MOSFETS used in the bi-directional switch 65, as discussed above, and the processor 120 switches off that particular MOSFET preventing electrical current in that particular direction only, say electrical current from T2 110 to T1 115 at 70, while allowing the other MOSFET to conduct electrical current in the other direction at 75.

The processor 120 is programmed to control the switching operation of the bidirectional switch module 60. The processor 120 is not limited to digital processors. Analog or other discrete or integrated circuit components may be arranged to enable the bi-directional switch module 60 to perform the same functions as those performed by the processor 120. The processor 120 preferably comprises a microprocessor, a processor clock, and a power supply. In one preferred embodiment, the microprocessor is a 68C08 processor having internal flash memory, analog-to-digital and digital-to-analog converters, available from Motorola, Inc. of Schaumburg, Ill. The internal clock may be a crystal-type oscillator or other oscillator mechanism known to those practiced in the art, and the power supply may be a discrete or integrated circuit configured to supply the processor 120 with appropriate DC voltage. It is contemplated that the processor 120 may be a combination of individual discrete or separate integrated circuits packaged in a single housing or it may be fabricated in a single integrated circuit.

In one embodiment, when a measured average value in a particular direction, say from T1 115 to T2 110 at 75, is above a default average value corresponding to that direction, the processor 120 executes a subroutine, stored in the memory of the processor 120, causing it to apply a time-varying control signal 125 to switch on/off the bi-directional switch 65, so that the average magnitude does not exceed a default average magnitude corresponding to that particular direction. Default average magnitude for each direction can be the same or different depending on the application. The time-varying control signal 125 can be an electrical signal in analog or digital format or, where wireless interface is preferred, it can be an electromagnetic signal in the form of a radio frequency signal or an optical signal. According to one variation of the present embodiment, the processor 120 applies a time-varying control signal 125 whose frequency is a function of the processor's oscillator frequency. According to another variation of the present embodiment, the processor 120 applies a time-varying control signal 125 whose frequency has been pre-programmed in the memory of the processor 120.

In one embodiment, the processor 120 is programmed to apply a control signal 125 to the control terminal 140 of the bi-directional switch 65 to switch off electrical current in both directions. The processor 120 then receives, via the sense line 95, a first voltage at 100 and a second voltage at 105 generated by the sensor 90. The processor 120 determines a direction of current flow by subtracting the first voltage from the second voltage. The processor 120 then applies a control signal 125 to the control terminal 140 to switch on electrical current and subsequently receives a third voltage via the sense line 95 which is generated by the sensor 90, said third voltage is sensed either at 100 or 105. The processor 120 computes a voltage difference by subtracting the third voltage from a larger value of the first voltage and second voltage. The processor compares the voltage difference to a default voltage associated with that direction and applies a time-varying control signal so that the voltage difference does not exceed the default voltage.

In one embodiment, the processor 120 is further programmed to apply a surge-off signal 125 to switch off an energy flow in either direction between the first terminal T1 115 and the second terminal T2 110 when an instantaneous magnitude of the energy flow in either direction measured by the sensor 90 is greater than one or more surge magnitudes. For instance, the signal on the sense line 95, generated by the sensor 90, may contain an instantaneous value of electrical current in the direction from T1 115 to T2 110. The processor 120 receives the signal via the sense line 95 and applies a surge-off signal 125, thereby turning off the electrical current in that direction only, when the instantaneous value is greater than a surge value corresponding to that direction. The processor 120 continues to controllably switch on/off the bi-directional switch 65 allowing the electrical current to flow in the other direction from T2 110 to T1 115.

In one embodiment, the processor 120 is programmed to continue to apply the surge-off signal 125 until a reset signal 130 is received by the processor 120 via a receiver 135 capable of receiving the reset signal 130. Upon reception of the reset signal 130, the processor 120 applies a surge-on signal 125 to switch on the electrical current in that direction.

In one embodiment, the processor 120 is further programmed to determine a time interval beginning at a time when an instantaneous magnitude of an energy flow in either direction between the first terminal T1 115 and the second terminal T2 110 of the bi-directional switch 65, included in the signal on the sense line 95 and generated by the sensor 90, rises above one or more overflow magnitudes and ending at a time when the instantaneous magnitude falls below the one or more overflow magnitudes, and to switch off the energy flow by applying an overflow-off signal 125 when the time interval is substantially equivalent to one or more overflow time intervals. For instance, during the time when sampled values of electrical current in a given direction are generated by the sensor 90 on the sense line 95, the processor 120 is programmed to start a counter whose counts are proportional to a clock cycle of the processor 120 when a sampled current value rises above a default current value and stop the counter when a subsequent sample falls below the default current value. The processor 120 determines a time interval from the counts and applies a control signal 125 to switch off the bi-directional switch 65 when the time interval is substantially equal to a default time interval. Overflow magnitudes and overflow time intervals for each direction can be the same or different depending on the application.

In one embodiment, the processor 120 is further programmed to apply a change-off signal 125 to switch off an energy flow in either direction between the first terminal T1 115 and the second terminal T2 110 of the bi-directional switch 65 when a difference magnitude of an energy flow in either direction, as measured by the sensor 90 and discussed above, is greater than one or more change magnitudes. For instance, the signal 95 generated by the sensor 90 may contain a difference value of electrical current in the direction from T2 110 to T1 115. The processor 120 receives the signal 95 and applies a change-off signal 125, thereby turning off the electrical current in that direction only, when the difference value is greater than a change value corresponding to that direction. The processor 120 continues to controllably switch on/off the bi-directional switch 65 allowing the electrical current to flow in the other direction from T1 111 to T2 110.

Referring to FIG. 3, one embodiment of a bi-directional switch module 60 will be discussed where one or more input average magnitudes are used for applying a time-varying control signal 125. According to this alternative embodiment, the bi-directional switch module 60 comprises the same hardware as described above, i.e., a bi-directional switch 65, a sensor 90, a processor 120, and in addition, it includes a receiver 135 capable of receiving one or more input average magnitudes and generating a signal 130 which includes the one or more input average magnitudes. In one application, the receiver 135 may be connected to a vehicle computer network so that the one or more input average magnitudes vary as the vehicle's operating condition changes. The processor 120 controllably switches on/off the energy flow in either direction by applying a time-varying control signal 125 to the control terminal 140 of the bi-directional switch 65 so that an average magnitude, as sensed by the sensor 90 and received via the sense line 95, does not exceed the one or more input average magnitudes received via the receiver 135. For instance, the bi-directional switch module 60 is initially configured so that it conducts electrical current in both directions between T1 115 and T2 110. The sensor 90 measures an average value of the electrical current in a particular direction, say from T1 to T2, and generates a signal on the sense line 95 containing the average value and the corresponding direction. The processor 120 compares the average value to an input average value received via the receiver 135. If the average value is below the input average value for that particular direction, the processor 120 takes no action with respect to applying a time-varying control signal 125. When the average value exceeds the input average value, the processor 120 applies a time-varying control signal 125 to vary the average magnitude of current in that direction.

In one embodiment, the processor 120 is further programmed to utilize one or more default average magnitudes, previously stored in the memory of the processor 120, instead of the input average magnitudes received via the receiver 135. According to one variation of the present embodiment, the receiver 135 generates a signal containing a data frame that includes an average value of an energy flow, a direction of the energy flow, and a flag indicating whether the input average magnitude or default average magnitude should be used. According to another variation of the present embodiment, the processor 120 may utilize previously stored default average magnitudes instead of input average magnitudes when the receiver 135 cannot generate the signal containing the input average magnitudes or the processor is unable to receive them.

In one embodiment, the receiver 135 comprises a data interface capable of receiving a time-varying input signal and a data framer capable of extracting one or more input average magnitudes from the time varying input signal and wherein the receiver generates a signal 130 which includes the one or more input average magnitudes. According to one variation of the present method, the receiver 135 is an input port of the processor 120, such as a RS232 input port, receiving a time-varying input signal containing, amongst others, one or more input average magnitudes. The receiver 135 can be utilized to receive other quantities such as one or more surge magnitudes, one or more overflow magnitudes, one or more overflow time intervals, one or more change magnitudes, and one or more overheat temperatures.

Referring to FIG. 3, one embodiment of the operation of the bi-directional switch module 60 is now described. The bi-directional switch 60 powers up when either T1 115 or T2 110 is connected to a power source. Similarly, the processor 120 receives its power from either source at 80 or 85. Upon power up, the processor 120 applies a control signal 125 to the control terminal 140 to set the bi-directional switch 65 to a closed-circuit position at 70 and 75 so that electrical current may flow in either direction between terminal T1 115 and terminal T2 110. The processor 120 then receives a signal on the sense line 95, generated by the sensor 90, which contains an average magnitude of electrical current and a corresponding direction. The processor 120 compares the average magnitude to a default average magnitude associated with that direction and applies a time-varying control signal so that the average magnitude does not exceed the default average magnitude.

In one situation where the bi-directional switch module 60 is utilized in a vehicle electrical system, terminal T1 115 may be connected to a battery and terminal T2 may be connected to a starter motor and an alternator. During vehicle engine cranking, the starter motor demands considerable electrical current from the battery and the bi-directional switch module is configured so that the default average magnitude of electrical current in the direction from T1 115 to T2 110 is high enough, hence the bi-directional switch 65 is set to conduct in that direction at 75, to ensure that the vehicle engine can properly complete its startup procedure. When the vehicle engine is operating and the alternator is producing power, the battery is recharged by the alternator and electrical current flows from T2 110 to T1 115. In a scenario where the battery is severely depleted, the electrical current demand on the alternator may prove detrimental to the vehicle electrical system. The processor 120 receives the average magnitude and direction of the electrical current on the sense line 95, generated by the sensor 90, and applies a time-varying control signal 125 so that current demand by the battery from the alternator is limited.

In one situation, where the battery develops a short or otherwise draws excessive electrical current from the alternator, the processor 120 determines a time interval during which the electrical current remains above a default over current value. The processor 120 then applies a control signal 125 to switch off electrical current flow from T2 110 to T1 115.

In other situations, where demand of electrical current, or its rate of change, from any device connected to either terminal T1 115 or terminal T2 110, exceed default values, the processor 120 applies a control signal 125 to switch off electrical current in that direction. In applications where environmental or operating condition exposes the bi-directional switch module 60 to above default temperatures, the processor 120 turns off the bi-directional switch 65 to protect it from damage.

In one embodiment, the bi-directional switch module 60 receives input average magnitudes via the receiver 135. The receiver 135 can be utilized to receive other quantities such as one or more surge magnitudes, one or more overflow magnitudes, one or more overflow time intervals, one or more change magnitudes, and one or more overheat temperatures, collectively referred to as input values. The receiver 135 may be connected to a vehicle computer network where the vehicle operating conditions are determined. The input values can change according to the vehicle operating conditions.

In one situation, where the bi-directional switch module 60 is integrated in a vehicle electrical system, the processor 120 receives input values that vary according to the vehicle operating condition. For instance, during vehicle startup, the input values of electrical current from T1 115 to T2 110 may be set at a high enough value so that high current demand by a starter motor, connected to terminal T2 110, can be met from a battery connected to the terminal T1 115. Subsequently, during the time when the vehicle engine is operating, a device, such as an alternator, connected to the terminal T2 110 may develop a short or otherwise demand high electrical current. The vehicle computer network may transmit a different input value to the processor 120, via the receiver 135, so that the electrical current from the battery will be limited or discontinued, by applying an appropriate control signal 125 as discussed above.

In another situation, where the same setup is used, other devices connected to the terminal T2 110, may require increased electrical current such that the battery has to be disconnected so that the alternator can properly supply power to the devices. The processor 120 receives input values commensurate with the existing vehicle operating condition and applies a control signal 125, to prevent electrical current from T2 110 to T1 115. Subsequently, an input value may be received from the vehicle computer network via the receiver 135, so that the processor 120 applies a time-varying control signal 125 to trickle charge the battery by limiting the electrical current.

Figure 5:
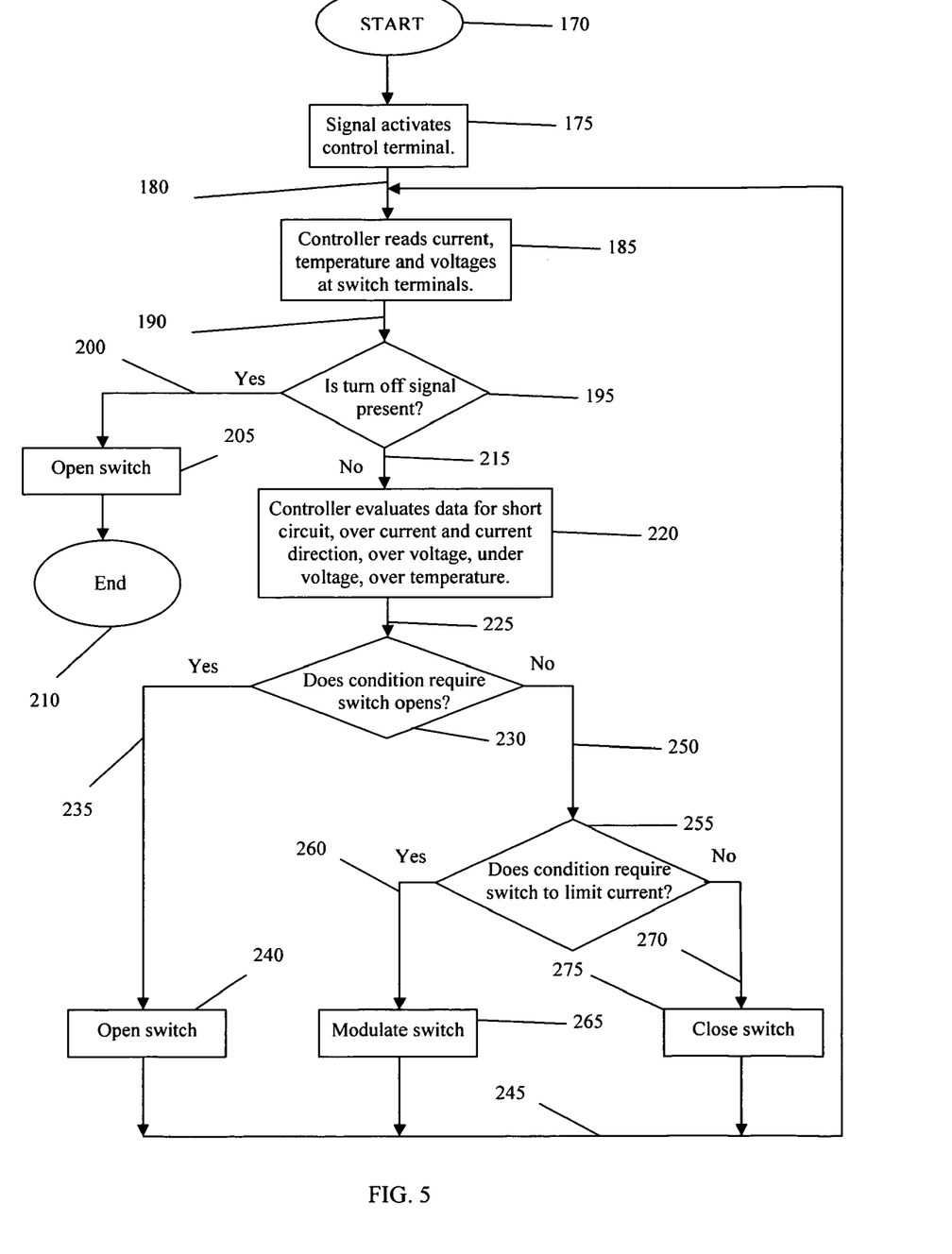
FIG. 5 is a flow chart illustrating preferred methods of switching a bi-directional switch module.

FIG. 5 illustrates an example of one method of implementing the bi-directional switch module 60 shown in FIG. 3. Upon power up at 170, the processor 120 receives power from a bi-functional device, such as a battery connected to the first terminal T1 115 of the bi-directional switch 65, and applies a signal to the control terminal 140 of the bidirectional switch 65 at 175 to activate the bi-directional switch 65. The processor 120 reads current, temperature, and voltage values at 185 from a signal generated by the sensor 90 at 180. The processor 120 determines whether a turn off signal is present at 195. According to one variation of the present method, the turn off signal can be received via the receiver 135. If the turn off signal is present, the processor applies a signal 200 to the control terminal 140 of the bi-directional switch 65 to switch off the bi-directional switch 65 at 205 and the processor 120 ends the present procedure at 210. If the turn off signal is not present the processor 120 proceeds to process the signal 95 generated by the sensor 90 at 215.

The processor 120 evaluates the signal 95 for short circuit (surge magnitude), over current (difference magnitude), current direction, over voltage, under voltage, and over temperature (overheat temperature) at 220. The processor proceeds to make the comparisons of these quantities with previously stored default values or input values obtained via the receiver 135 at 230. If the comparisons require the switch to open, then the processor 120 applies an appropriate signal, as discussed hereinabove, to open the bi-directional switch 65 at 240 and reverts back to step 180. If the comparisons do not evaluate to a true value at 250, the processor 120 proceeds to determine whether a time-varying control signal need to be applied to limit the current at 255.

If the processor 120 determines that the condition requires the bi-directional switch module 60 to limit the current at 260, the processor 120 applies a time-varying control signal to the control terminal 140 of the bi-directional switch 65 to maintain a current that is equivalent to a previously stored default value or an input value received via the receiver 135 at 265. If the condition does not require the bi-directional switch module 60 to limit the current at 270, the processor 120 applies a signal to close the bi-directional switch 65.

The forgoing discloses a bi-directional switch module and method of operation. The bi-directional switch module comprises a controller, such as a microprocessor, which operates to control the magnitude and direction of an energy flow between a first and a second terminal of the bi-directional switch by controllably switching on/off the energy flow so that the energy flow in either direction does not exceed a default average value corresponding to that direction. The bi-directional switch may comprise a receiver where an input average value is received and used for controlling the switching operation. The bi-directional switch module is further capable of being switched off when the energy flow, its rate of change, duration, or a temperature of the bi-directional switch exceed threshold values.

The foregoing explanations, descriptions, illustrations, examples, and discussions regarding this invention have been set forth to demonstrate the utility and novelty of this invention and are by no means restrictive of its scope. It is the following claims, including all equivalents, which are intended to define the scope of this invention.

What is claimed is:

1. A bi-directional switch module, comprising:
   (a) bi-directional switch capable of switching on/off an energy flow in either direction between a first and a second terminal of the bi-directional switch in response to a control signal applied to a control terminal of the bi-directional switch;

(b) sensor capable of sensing an average magnitude of the energy flow in either direction between the first and the second terminal of the bi-directional switch; and (c) processor, including a programmable code operable on the processor;

the processor controllably switching on/off the energy flow in either direction by applying a time-varying control signal to the control terminal of the bi-directional switch so that the average magnitude does not exceed one or more default average magnitudes.

2. The bi-directional switch module of claim 1, wherein the bi-directional switch comprises a bi-directional semiconductor switch.

3. The bi-directional switch module of claim 1, wherein the sensor comprises an electrical current sensor capable of sensing an average magnitude of an electrical current in either direction.

4. The bi-directional switch module of claim 1, wherein the time-varying control signal comprises a time-varying electrical signal.

5. The bi-directional switch module of claim 4, wherein the bidirectional switch is configured to allow the energy to flow from the first terminal to the second terminal when a voltage level of the time-varying electrical signal is substantially above a mean voltage level.

6. The bi-directional switch module of claim 4, wherein the bi-directional switch is configured to allow the energy to flow from the second terminal to the first terminal when a voltage level of the time-varying electrical signal is substantially below a mean voltage level.

7. The bi-directional switch module of claim 1, wherein the time-varying control signal comprises a time-varying electromagnetic signal.

8. The bi-directional switch module of claim 7, wherein the time varying electromagnetic signal comprises at least one of a radio frequency signal and an optical signal.

9. The bi-directional switch module of claim 1, wherein:
the sensor is further capable of sensing an instantaneous magnitude of an energy flow in either direction; and wherein:
the processor switching off the energy flow in either direction by applying a surge-off signal to the control terminal when the instantaneous magnitude is greater than one or more surge magnitudes.

10. The bi-directional switch module of claim 9, further comprising a receiver capable of receiving a reset signal and wherein the processor switching on the energy flow in either direction by applying a surge-on signal to the control terminal in response to the received reset signal.

11. The bi-directional switch module of claim 1, wherein:
the sensor is further capable of sensing an instantaneous magnitude of an energy flow in either direction; and wherein:
the processor determining a time interval beginning at a time when the instantaneous magnitude rises above one or more overflow magnitudes and ending at a time when the instantaneous magnitude falls below the one or more overflow magnitudes, and switching off the energy flow by applying an overflow-off signal to the control terminal when the time interval is substantially equivalent to one or more overflow time intervals.

12. The bi-directional switch module of claim 1, wherein:
the sensor is further capable of sensing a difference magnitude of an energy flow between two consecutive instantaneous magnitudes of the energy flow obtained a difference time interval apart; and wherein:
the processor switching off the energy flow by applying a change-off signal to the control terminal when the difference magnitude is greater than one or more change magnitudes.

13. The bi-directional switch module of claim 1, wherein:
the sensor is further capable of sensing a temperature of the bi-directional switch module; and wherein:
the processor switching off the energy flow in either direction by applying an overheat signal to the control terminal when the temperature is greater than one or more overheat temperatures.

14. A bi-directional switch module, comprising:
(a) bi-directional switch capable of switching on/off an energy flow in either direction between a first and a second terminal of the bi-directional switch in response to a control signal applied to a control terminal of the bi-directional switch;

(b) sensor capable of sensing an average magnitude of the energy flow in either direction between the first and the second terminal of the bi-directional switch;

(c) receiver capable of receiving one or more input average magnitudes; and (d) processor, including a programmable code operable on the processor;

the processor controllably switching on/off the energy flow by applying a time-varying control signal to the control terminal of the bi-directional switch so that the average magnitude does not exceed at least one of the one or more input average magnitudes.

15. The bi-directional switch module of claim 14, wherein the processor utilizing one or more default average magnitudes instead of the one or more input average magnitudes.

16. The bi-directional switch module of claim 14, wherein the receiver comprises:
(a) data interface capable of receiving a time-varying input signal; and
(b) data framer capable of extracting one or more input average magnitudes from the time-varying input signal.

17. The bi-directional switch module of claim 16, wherein the time-varying input signal comprises a time-varying electrical signal.

18. The bi-directional switch module of claim 16, wherein the time-varying input signal comprises a time-varying electromagnetic signal.

19. A bi-directional switch module, comprising:
(a) bi-directional switch capable of switching on/off an energy flow in either direction between a first and a second terminal of the bi-directional switch in response to a control signal applied to a control terminal of the bidirectional switch;

(b) sensor capable of sensing an average magnitude of the energy flow in either direction between the first and the second terminal of the bi-directional switch module;

(c) comparator capable of generating a match signal when the average magnitude is greater than one or more default average magnitudes; and (d) controller capable of controllably switching on/off the energy flow in either direction by applying a time-varying control signal to the control terminal of the bi-directional switch in response to the match signal.

20. The bi-directional switch module of claim 19, wherein:
(a) the sensor is further capable of sensing an instantaneous magnitude of an energy flow in either direction;
(b) the comparator is further capable of generating a match signal when the instantaneous magnitude is greater than one or more surge magnitudes; and (c) the controller is further capable of switching off the energy flow in either direction by applying a surge-off signal to the control terminal in response to the match signal.

21. The bi-directional switch module of claim 19, wherein:
(a) the sensor is further capable of sensing an instantaneous magnitude of an energy flow in either direction; and wherein the bi-directional switch module further comprises:
(b) timer capable of determining a time interval beginning at a time when the instantaneous magnitude rises above one or more overflow magnitudes and ending at a time when the instantaneous magnitude falls below the one or more overflow magnitudes; and wherein:
(c) the comparator is further capable of generating a match signal when the time interval is substantially equivalent to one or more overflow time intervals; and
(d) the controller is further capable of switching off the energy flow in either direction by applying an overflow-off signal to the control terminal in response to the match signal.

22. The bi-directional switch module of claim 19, wherein:
(a) the sensor is further capable of sensing a difference magnitude of an energy flow in either direction between two consecutive instantaneous magnitudes of the energy flow obtained a difference time interval apart;
(b) the comparator is further capable of generating a match signal when the difference magnitude is greater than one or more change magnitudes; and
(c) the controller is further capable of switching off the energy flow in either direction by applying a change-off signal to the control terminal in response to the match signal.

23. The bi-directional switch module of claim 19, wherein:
(a) the sensor is further capable of sensing a temperature of the bi-directional switch;
(b) the comparator is further capable of generating a match signal when the temperature is greater than one or more overheat temperatures; and
(c) the controller is further capable of switching off the energy flow by applying an overheat signal to the control terminal in response to the match signal.

24. A bi-directional switch module, comprising:
(a) bi-directional switch capable of switching on/off an energy flow in either direction between a first and a second terminal of the bi-directional switch in response to a control signal applied to a control terminal of the bi-directional switch;
(b) sensor capable of sensing an average magnitude of the energy flow in either direction between the first and the second terminal of the bi-directional switch;
(c) receiver capable of receiving one or more input average magnitudes;
(d) comparator capable of generating a match signal when the average magnitude is greater than at least one of the one or more input average magnitudes; and
(e) controller capable of controllably switching on/off the energy flow in either direction by applying a time-varying control signal to the control terminal in response to the match signal.

25. A bi-directional switch module, comprising:
(a) means for bi-directional switching capable of switching on/off an energy flow in either direction between a first and a second terminal of the means for bi-directional switching in response to a control signal applied to a control terminal of the means for bi-directional switching;
(b) sensor capable of sensing an average magnitude of the energy flow in either direction between the first and the second terminal of the means for bi-directional switching; and
(c) processing means for controllably switching on/off the energy flow in either direction by applying a time-varying control signal to the control terminal so that the average magnitude does not exceed one or more default average magnitudes.

26. A bi-directional switch module, comprising:
(a) means for bi-directional switching capable of switching on/off an energy flow in either direction between a first and a second terminal of the means for bi-directional switching in response to a control signal applied to a control terminal of the means for bi-directional switching;
(b) sensor capable of sensing an average magnitude of the energy flow in either direction between the first and the second terminal of the means for bi-directional switching;
(c) receiver capable of receiving one or more input average magnitudes; and
(d) processing means for controllably switching on/off the energy flow in either direction by applying a time-varying control signal to the control terminal so that the average magnitude does not exceed at least one of the one or more input average magnitudes.

27. A method for switching a bi-directional switch module, comprising:
(a) sensing an average magnitude of an energy flow in either direction between a first and a second terminal of the bi-directional switch module;
(b) comparing the average magnitude to one or more default average magnitudes; and
(c) controllably switching on/off the energy flow in either direction by applying a time-varying control signal so that the average magnitude does not exceed at least one of the one or more default average magnitudes.

28. The method of claim 27, wherein the one or more default average magnitudes comprises a first default average magnitude corresponding to a first direction from the first terminal to the second terminal and a second default average magnitude corresponding to a second direction from the second terminal to the first terminal.

29. The method of claim 27, wherein sensing an average magnitude of an energy flow comprises sensing an average magnitude of an electrical current.

30. The method of claim 27, wherein applying a time-varying control signal comprises applying a time-varying electrical signal.

31. The method of claim 27, wherein applying a time-varying control signal comprises applying a time-varying electromagnetic signal.

32. The method of claim 31, wherein the electromagnetic signal comprises at least one of a radio frequency signal and an optical signal.

33. The method of claim 27, further comprising:
(a) sensing an instantaneous magnitude of an energy flow in either direction;
(b) comparing the instantaneous magnitude to one or more surge magnitudes; and
(c) switching off the energy flow in either direction by applying a surge-off signal when the instantaneous magnitude is greater than at least one of the one or more surge magnitudes.

34. The method of claim 33, further switching on the energy flow in either direction by applying a surge-on signal when a reset signal is received.

35. The method of claim 27, further comprising:
(a) sensing an instantaneous magnitude of an energy flow in either direction;
(b) determining a time interval beginning at a time when the instantaneous magnitude rises above one or more overflow magnitudes and ending at a time when the instantaneous magnitude falls below the one or more overflow magnitudes;
(c) comparing the time interval to one or more overflow time intervals; and
(d) switching off the energy flow in either direction by applying an overflow-off signal when the time interval is substantially equivalent to at least one of the one or more overflow time intervals.

36. The method of claim 27, further comprising:
(a) sensing a difference magnitude of an energy flow in either direction between two consecutive instantaneous magnitudes of the energy flow obtained a difference time interval apart;
(b) comparing the difference magnitude to one or more change magnitudes; and
(c) switching off the energy flow in either direction by applying a change-off signal when the difference magnitude is greater than at least one of the one or more change magnitudes.

37. The method of claim 27, further comprising:
(a) sensing a temperature of the bi-directional switch module;
(b) comparing the temperature to one or more overheat temperatures; and
(c) switching off the energy flow in either direction by applying an overheat signal when the temperature is greater than at least one of the one or more overheat temperatures.

38. A method for switching a bi-directional switch module, comprising:
(a) sensing an average magnitude of an energy flow in either direction between a first and a second terminal of the bi-directional switch module;
(b) receiving one or more input average magnitudes;
(c) comparing the average magnitude to the one or more input average magnitudes; and
(d) controllably switching on/off the energy flow in either direction by applying a time-varying control signal so that the average magnitude does not exceed at least one of the one or more input average magnitudes.

39. The method of claim 38, further comprising utilizing one or more default average magnitudes instead of the one or more input average magnitudes.

40. The method of claim 38, wherein receiving an input average magnitude comprises:
(a) receiving a time-varying input signal; and
(b) extracting one or more input average magnitudes from the time-varying input signal.

41. The method of claim 40, wherein the time-varying input signal comprises a time-varying electrical signal.

42. The method of claim 40, wherein the time-varying input signal comprises a time-varying electromagnetic signal.

* * * * *